United States Patent
Krishnan et al.

(10) Patent No.: US 12,099,661 B1
(45) Date of Patent: Sep. 24, 2024

(54) MULTI-DIMENSIONAL EXTRASENSORY DECIPHERING OF HUMAN GESTURES FOR DIGITAL AUTHENTICATION AND RELATED EVENTS

(71) Applicant: BANK OF AMERICA CORPORATION, Charlotte, NC (US)

(72) Inventors: Subburathinam Krishnan, Tamil Nadu (IN); Abhishek Arya, Telangana (IN); Prabhakaran Balasubramanian, Tamil Nadu (IN); Durga Prasad P. Khuttumolu, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/243,292

(22) Filed: Sep. 7, 2023

(51) Int. Cl.
*G06F 3/01* (2006.01)
*G06F 21/31* (2013.01)
*G06T 13/40* (2011.01)

(52) U.S. Cl.
CPC .............. *G06F 3/017* (2013.01); *G06F 21/31* (2013.01); *G06T 13/40* (2013.01)

(58) Field of Classification Search
None
See application file for complete search history.

(56) References Cited

U.S. PATENT DOCUMENTS

| | | | |
|---|---|---|---|
| 6,948,829 B2 | 9/2005 | Verdes et al. | |
| 7,072,587 B2 | 7/2006 | Dietz et al. | |
| 7,580,643 B2 | 8/2009 | Moore et al. | |
| 8,214,084 B2 | 7/2012 | Ivey et al. | |
| 8,226,274 B2 | 7/2012 | Horn et al. | |
| 8,324,817 B2 | 12/2012 | Ivey et al. | |
| 8,419,223 B2 | 4/2013 | Withers | |
| 8,547,036 B2 | 10/2013 | Tran | |
| 8,571,716 B2 | 10/2013 | Ivey et al. | |
| 8,901,823 B2 | 12/2014 | Scapa et al. | |
| 8,946,996 B2 | 2/2015 | Ivey et al. | |
| 9,101,026 B2 | 8/2015 | Ivey et al. | |
| 9,192,030 B2 | 11/2015 | Tran | |
| 9,310,064 B2 | 4/2016 | Tran | |
| 9,398,661 B2 | 7/2016 | Scapa et al. | |
| 9,414,458 B2 | 8/2016 | Pederson | |
| 9,585,219 B2 | 2/2017 | Ahn | |

(Continued)

*Primary Examiner* — Carl Adams
(74) *Attorney, Agent, or Firm* — Moore & Van Allen PLLC; James C. Edwards

(57) ABSTRACT

Virtual assistant devices and related methods are described that allow users having special needs to communicate with the virtual assistant device. The virtual assistant devices are augmented with additional intelligent sensors, including, but not limited to, three-dimensional optical sensors that are used to capture optical signals of user's non-verbal communication (e.g., sign language, lip movements, gestures or the like). Additionally, the virtual assistant device includes an Artificial Intelligence (AI)-based engine that includes one or more Machine Learning (ML) models trained on user-specific data and used to determine the non-verbal communication of the user (i.e., sign language, lip movements or other gestures) based on inputs derived from the sensors. Moreover, the virtual assistant devices may be configured to generate and display visual information, such as three-dimensional floating avatars of the user and/or the virtual assistant.

14 Claims, 7 Drawing Sheets

(56) References Cited

U.S. PATENT DOCUMENTS

| | | | |
|---|---|---|---|
| 9,635,727 B2 | 4/2017 | Scapa et al. | |
| 9,924,579 B2 | 3/2018 | Tran | |
| 10,111,305 B2 | 10/2018 | Tran | |
| 2012/0026723 A1 | 2/2012 | Wheelock et al. | |
| 2012/0086345 A1 | 4/2012 | Tran | |
| 2014/0267024 A1* | 9/2014 | Keller | G06F 3/014 |
| | | | 345/156 |
| 2016/0218807 A1 | 7/2016 | Tran | |
| 2019/0251702 A1* | 8/2019 | Chandler | G10L 15/24 |
| 2023/0343011 A1* | 10/2023 | Kelly | G06T 13/205 |

* cited by examiner

MULTI-DIMENSIONAL EXTRASENSORY DECIPHERING OF HUMAN GESTURES FOR DIGITAL AUTHENTICATION AND RELATED EVENTS

FIELD OF THE INVENTION

The present invention is generally related to communication, and, more specifically, a multi-dimensional extrasensory virtual assistant device that provides special needs user's the ability to communicate with the virtual assistant device via non-verbal communication, such as gestures/sign language, lip movements or the like which are detected by three dimensional optical sensors and deciphered using an Artificial Intelligence (AI)-based engine implementing Machine Learning (ML) models.

BACKGROUND

A virtual assistant is a software-based application that provides services or performs tasks for users, typically in a conversational manner (i.e., capturing voice queries and audible responses). These virtual assistants are designed to stimulate human interaction and assist users with various tasks through the use of Natural Language Processing (NLP) and Artificial Intelligence (AI) technologies. Virtual assistants may be employed with various different devices and platforms, including stand-alone devices, such as, smart speakers or the like and multi-faceted devices, such as smartphones, smart watches, computers and the like.

However, users with special needs, such as speech-impaired and/or hearing-impaired present unique circumstances and challenges when trying to communicate with conventional virtual assistants, which rely on the user being able to speak and/or hear in order for communication to occur.

Therefore, a need exists to develop systems, methods, computer program products and the like that provide for virtual assistants capable for use by individuals with special needs (i.e., speech-impaired, hearing-impaired and the like). In this regard, the desired systems, methods, computer program products and the like should provide adequate intelligence, efficiency and reliability to be able to identify and analyze visual cues, such as sign language, lip movements or the like so that a special needs user can readily and easily communicate with a virtual assistant.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for systems, methods and computer program devices that augment virtual assistant devices such that users having special needs (e.g., hearing-impaired, speech-impaired and the like) are able to communicate with and, in some embodiments, receive communication from the virtual assistant device.

In this regard, according to embodiments of the present invention, the virtual assistant devices are augmented with additional intelligent sensors, including, but not limited to, three-dimensional optical sensors that are used to capture optical signals and transmit the optical signals within the virtual assistant device. In addition, the virtual assistant device includes an Artificial Intelligence (AI)-based engine that includes one or more Machine Learning (ML) models to determine the non-verbal communication of the user (i.e., sign language, lip movements or other gestures) based on inputs derived from the sensors, such as inputs from the optical sensors and any other sensors embodied in the virtual assistant that may add in the determination of the non-verbal communication. According to the embodiments of the present invention, the ML models used to determine the non-verbal communication are trained on user-specific data, including personal details, preferences, historical resource exchange event data and patterns (i.e., both past resource exchange events conducted via the virtual assistant device/platform and those conducted outside of the virtual assistant device/platform). By training the ML models with such user-specific data, the present invention is able to more accurately and efficiently determine the non-verbal communication of the user.

In optional embodiments of the invention, the virtual assistant devices includes means for generating and displaying visual information to the users. Specifically, the virtual assistant devices may be configured to generate avatars that are three-dimensional floating images of either the user or the virtual assistant. In such embodiments of the invention, the virtual assistant device includes or is in network communication with a three-dimensional display that is configured to display the avatars. In those embodiments of the invention in which the avatar(s) include an avatar that is an image of the user, the avatar is configured to replicate the movements of the user and in those embodiments in which the avatar(s) include an avatar that is an image of a virtual assistant, the avatar is configured to provide movements that communicate, non-verbally, a response to the user. In such embodiments of the invention, the optical sensors of the virtual assistant device may also capture optical signals from the avatar to determine the avatars movements and to adjust movements accordingly based on comparisons between the movement of the avatar and the movement of the user or intended response.

In specific embodiments of the invention, the virtual assistant avatar or any other response provided to the user is implemented in an active mode, in which a non-verbal response is displayed/provided in real-time response to the user providing non-verbal communication (e.g., sign language, lip movements, gestures and the like). While in other embodiments of the invention, the virtual assistant avatar or any other response provided to the user is implemented in a passive mode, in which the virtual assistant is a non-verbal response is displayed/provided as the response/information becomes available (e.g., breaking emergency weather/news) or as preconfigured by the user (e.g., reminders, daily weather/news updates or the like).

In specific embodiments of the invention, the continual capture of signals by the sensors is triggered by a predefined visual cue/gesture, which may be predefined by the user or the visual assistant platform. In specific embodiments of the invention the AI-based engine includes a user authentication sub-engine which is configured to authenticate the user based on a predefined visual/non-verbal cue, which either serves as the user's authentication credential or reads as the user's authentication credentials (e.g., sign language, lip movements or the like). In this regard, the AI-based engine captures signals from the intelligent sensors including the 3-D optical sensors and applies inputs derived from the signals to secondary ML model(s) that are configured to determine the non-verbal user authentication credentials and communicate the user credentials to an authentication platform for subsequent user authentication. Similar to the first ML models discussed above, the second ML models are trained on user-specific data, such as historical user authentications performed via the virtual assistant and the like.

In other specific embodiments of the invention, the AI-based engine is capable of detecting the emotional state of the user (i.e., the sub-conscious mind of the user). In this regard, the AI-based engine includes a user emotional state determination sub-engine which is configured to determine the emotional state of the user through implementation of secondary ML model(s) that are configured to receive inputs derived from the various sensors, including the 3-D optical sensors and determine emotional state of the user. Once the emotional state is determined and communicated to the response system of the virtual assistant, the response that is determined and presented to the user is tailored based on the user's emotional state (e.g., frustrated, anxious, satisfied/pleased and the like).

A system for multi-dimensional extrasensory deciphering of non-verbal communication defines first embodiments of the invention. The system includes a virtual assistant device including a memory, one or more computing processing devices in communication with the memory and a plurality of sensors in communication with at least one of computing processing device(s). The sensors include at least one three-dimensional optical sensor configured for capturing, at least, optical signals associated with visual cues of the user. The system additionally includes an artificial intelligence (AI)-based engine that is stored in the memory, and executable by at least one of the one or more computing processing devices. The AI-based engine includes first machine-learning (ML) model(s) trained at least on user-specific data (e.g., personal details, preferences and the like) including historical resource exchange event data and/or patterns for purposes of determining non-verbal communication of the user. In this regard, the AI-based engine is configured to receive, at the first ML model(s) first inputs derived (e.g., digitized) from signals captured from the plurality of sensors including the optical signals captured from the at least one three-dimensional optical sensor, and, based on the first inputs, execute the first ML model(s) to determine a first transcript of the non-verbal communication of the user. Once the first transcript has been determined, the AI-based engine is configured to communicate the first transcript of the non-verbal communication to a response system associated with the virtual assistant device, which is configured to processes the first transcript of the non-verbal communication to determine a responsive communication to provide to the user.

In specific embodiments the system further includes a three-dimensional-enabled display that is in communication with the virtual assistant device (e.g., embodied within the virtual assistant device or in network communication with the virtual assistant device). In such embodiments the system further includes a floating image-generating and communication engine stored in the memory, and executable by one of the computing processing devices. The floating image-generating and communication engine is configured to generate a user avatar that is a three-dimensional floating image of the user and display the user avatar in the three-dimensional-enabled display. Once displayed, the user avatar is configured to perform movements that replicate detected visual cues of the user. In other embodiments of the system, a floating image-generating and communication engine is configured to generate a virtual assistant avatar that is a three-dimensional floating image of a virtual assistant and display the virtual assistant avatar in the three-dimensional-enabled display. Once displayed, the virtual assistant avatar is configured to perform movements (e.g., sign language, lip movements or the like) that provide the responsive communication to the user in a non-verbal communication format. In related embodiments of the system, the one three-dimensional optical sensor(s) are configured for detecting movements of the user and/or virtual assistant avatar within the display. In such embodiments of the system, the floating image-generating and communication engine further comprises a quality assurance sub-engine that is configured to adjust the movements of the user and/or virtual assistant avatar based on a comparison between the detected movements of the avatar and the detected visual cues of the user or the responsive communication.

In other embodiments of the system, the floating image-generating and communication engine is further configured to display the avatar in the three-dimensional-enabled display in either an (i) an active mode in which the avatar is displayed as a real-time response to capturing the optical signals associated with visual cues of the user or (ii) a passive mode in which the avatar is displayed in response to the virtual assistant device determining a need for preconfigured communication that has been requested by the user.

In still further specific embodiments of the system, the AI-based engine further includes at least one second machine-learning (ML) model trained at least on user-specific data including historical resource exchange event emotional state data for purposes of determining an emotional state the user. In such embodiments of the system, the AI-based engine is configured to receive, at one or more of the second ML models, second inputs derived from signals captured from the plurality of sensors including the optical signals captured from the at least one three-dimensional optical sensor, and, based on the second inputs, execute the one or more of the second ML models to determine a current emotional state of the user. In response to determining the current emotional state of the user, the emotional state of the user is communicated to the response system which, in turn, determines the responsive communication based further on the emotional state of the user.

In other specific embodiments of the system, the AI-based engine further includes a user authentication sub-engine comprising at least one second machine-learning (ML) model trained at least on user-specific data including historical authentication credential input data for purposes of determining non-verbal authentication credential communication from the user. In such embodiments of the system, the user authentication sub-engine is configured to receive, at one or more of the second ML models, second inputs derived from signals captured from the plurality of sensors including the optical signals captured from the at least one three-dimensional optical sensor, and, based on the second inputs, execute the one or more of the second ML models to determine a second transcript of the non-verbal authentication credential communication of the user. In response to determining the second transcript, the user authentication sub-engine is configured to communicate the second transcript of the non-verbal authentication credential communication to an authenticating entity/platform, which, in turn, processes the authentication credential communication to authenticate/authorize the user for conducting one or more resource exchange events.

Moreover, in further specific embodiments of the system, the at least one three-dimensional optical sensor is further configured for detecting a preconfigured visual cue of the user. In such embodiments of the system, detection of the preconfigured visual cue triggers further continual capturing of the optical signals.

A computer-implemented method for multi-dimensional extrasensory deciphering of non-verbal communication of a user defines second embodiments of the invention. The method being executable by one or more computing device processors. The method includes capturing optical signals from at least one three-dimensional optical sensor disposed within a virtual assistant device and detecting from the optical signals visual cues performed by a user. In addition, the method includes receiving, at one or more of the first ML models, first inputs derived from the optical signals captured from the at least one three-dimensional optical sensor, and, based on the first inputs, executing the one or more of the first ML models to determine a first transcript of the non-verbal communication of the user based on the visual cues. In response to determining, the method includes communicating the first transcript of the non-verbal communication to a response system associated with the virtual assistant device. The response system processes the non-verbal communication of the user to determine a responsive communication to provide to the user.

In specific embodiments the method further includes generating at least one chosen from the group consisting of (i) a first avatar that is a three-dimensional floating image of the user and (ii) a second avatar that is a three-dimensional floating image of a virtual assistant. In response to generating, the method further includes displaying the first avatar or second avatar within a three-dimensional-enabled display that is in communication with the virtual assistant device. Upon display, the first avatar is configured to perform movements that replicate detected visual cues of the user and the second avatar is configured to perform movements that provide the responsive communication to the user in a non-verbal communication format. In related embodiments the method further includes detecting from the optical signals movements of at least one chosen from the group consisting of (i) the first avatar and (ii) the second avatar, and adjusting the movements performed by either (i) the first avatar, or (ii) the second avatar based on the corresponding (i) detected movements of the first avatar in comparison to the detected visual cues of the user and (ii) detected movements of the avatar in comparison to the responsive communication. In further related embodiments of the method, displaying the second avatar in the three-dimensional-enabled display further includes displaying the second avatar in the three-dimensional-enabled display in either (i) an active mode in which the avatar is displayed as a real-time response to capturing the optical signals associated with visual cues of the user, or (ii) a passive mode in which the avatar is displayed in response to the virtual assistant device determining preconfigured communication that has been requested by the user.

In other specific embodiments the method further includes capturing signals from a plurality of sensors included within the virtual assistant device and receiving, at one or more second ML models, second inputs derived from signals captured from the plurality of sensors including the optical signals captured from the at least one three-dimensional optical sensor. Additionally, based on the second inputs, the method further includes executing the one or more second ML models to determine an emotional state of the user, and communicating the emotional state of the user to the response system. The response system determines the responsive communication based further on the emotional state of the user.

In still further specific embodiments, the method includes capturing signals from a plurality of sensors included within the virtual assistant device, and receiving, at one or more second ML models, second inputs derived from signals captured from the plurality of sensors including the optical signals captured from the at least one three-dimensional optical sensor. Based on the second inputs, the method further includes executing the one or more second ML models to determine a second transcript of the non-verbal authentication credential communication of the user. In response to determining the second transcript, the method includes communicating the second transcript to an authenticating entity/platform. The virtual assistant authenticating entity/platform processes the authentication credential communication of the user to authenticate the user for conducting one or more resource exchange events.

A computer program product including a non-transitory computer-readable medium defines third embodiments of the invention. The computer-readable medium includes sets of codes for causing one or more computing devices to capture optical signals from at least one three-dimensional optical sensor disposed within a virtual assistant device, and receive, at one or more of the first ML models, first inputs derived from the optical signals captured from the at least one three-dimensional optical sensor. Further, computer-readable medium includes sets of codes for causing the computing device(s) to, based on the first inputs, execute the one or more of the first ML models to determine a first transcript of the non-verbal communication of the user. In response to determining the first transcript, the sets of codes further cause the one or more computing devices to communicate the first transcript of the non-verbal communication to a response system associated with the virtual assistant device. The response system processes the non-verbal communication of the user to determine a responsive communication to provide to the user.

In specific embodiments of the computer program product, the sets of codes further cause the one or more computing devices to generate either a (i) a first avatar that is a three-dimensional floating image of the user, or (ii) a second avatar that is a three-dimensional floating image of a virtual assistant. In response to generating, the sets of codes further cause the one or more computing devices to display the first avatar or second avatar in the three-dimensional-enabled display that is in communication with the virtual assistant device. Upon display, the first avatar is configured to perform movements that replicate detected visual cues of the user and the second avatar is configured to perform movements that provide the responsive communication to the user in a non-verbal communication format.

In other specific embodiments of the computer program product, the sets of codes further cause the one or more computing devices to detect from the optical signals movements of (i) the first avatar and (ii) the second avatar, and adjust the movements performed by (i) the first avatar and (ii) the second avatar based on either (i) the detected movements of the first avatar in comparison to the detected visual cues of the user or (ii) the detected movements of the avatar in comparison to the responsive communication.

In still further specific embodiments of the computer program product, the sets of codes further cause the one or more computing devices to capture signals from a plurality of sensors included within the virtual assistant device, and receive, at one or more second ML models, second inputs derived from signals captured from the plurality of sensors including the optical signals captured from the at least one three-dimensional optical sensor. The sets of codes further cause the one or more computing devices to, based on the second inputs, execute the one or more second ML models to determine an emotional state of the user, and communicate the emotional state of the user to the response system. The response system determines the responsive communication based further on the emotional state of the user.

Moreover, in further embodiments of the computer program product, the sets of codes further cause the one or more computing devices to capture signals from a plurality of sensors included within the virtual assistant device, and receive, at one or more second ML models, second inputs derived from signals captured from the plurality of sensors including the optical signals captured from the at least one three-dimensional optical sensor. The sets of codes further cause the one or more computing devices to, based on the second inputs, execute the one or more second ML models to determine a second transcript of the non-verbal authentication credential communication of the user, and communicate the second transcript of the non-verbal authentication credential communication to an authenticating entity. The authenticating entity processes the authentication credential communication of the user to authenticate the user for conducting one or more resource exchange events.

Thus, according to embodiments of the invention, which will be discussed in greater detail below, the present invention provides for virtual assistant devices and related methods that allow users having special needs (e.g., hearing-impaired, speech-impaired and the like) to communicate with and, in some embodiments, receive communication from the virtual assistant device. Specifically, the virtual assistant devices are augmented with additional intelligent sensors, including, but not limited to, three-dimensional optical sensors that are used to capture optical signals of user's non-verbal communication (e.g., sign language, lip movements, gestures or the like). In addition, the virtual assistant device includes an Artificial Intelligence (AI)-based engine that includes one or more Machine Learning (ML) models trained on user-specific data and used to determine the non-verbal communication of the user (i.e., sign language, lip movements or other gestures) based on inputs derived from the sensors, such as inputs from the optical sensors and any other sensors embodied in the virtual assistant. In further embodiments of the invention, the virtual assistant devices are capable of generating and displaying visual information to the users. Specifically, the virtual assistant devices may be configured to generate avatars that are three-dimensional floating images of either the user or the virtual assistant. In such embodiments of the invention, the virtual assistant device includes or is in network communication with a three-dimensional display that is configured to display the avatars.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
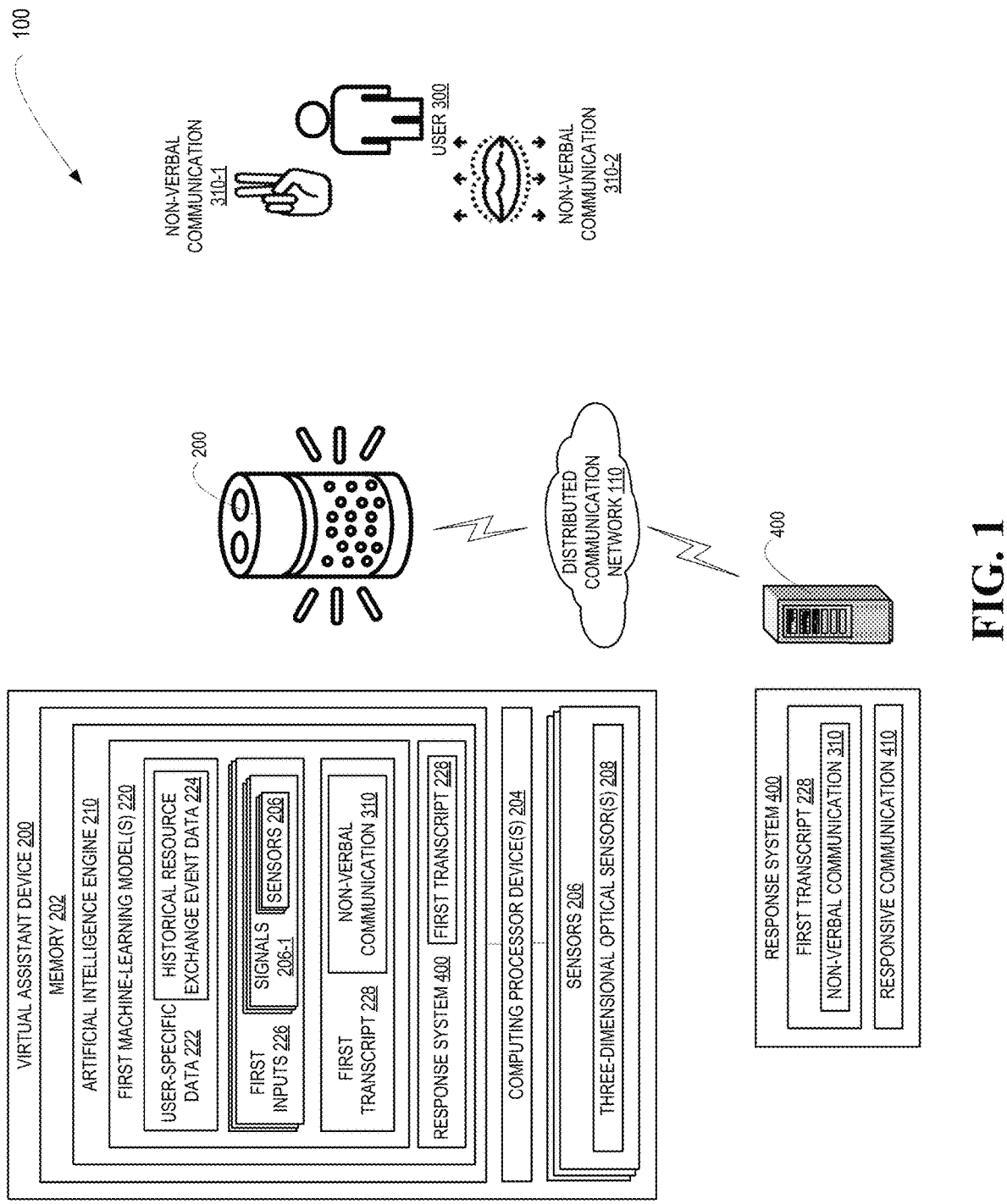
Figure 2:
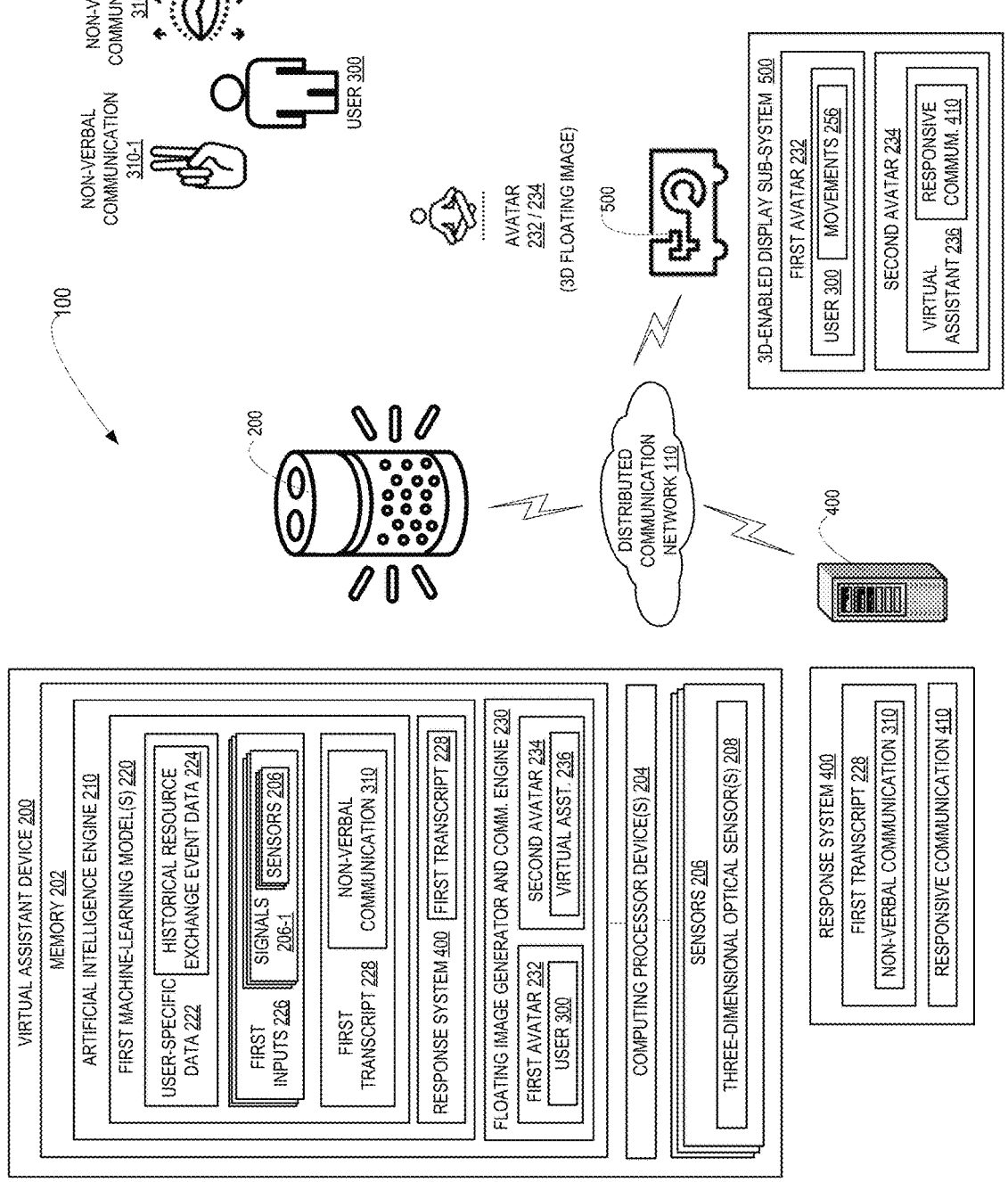
Figure 3A:
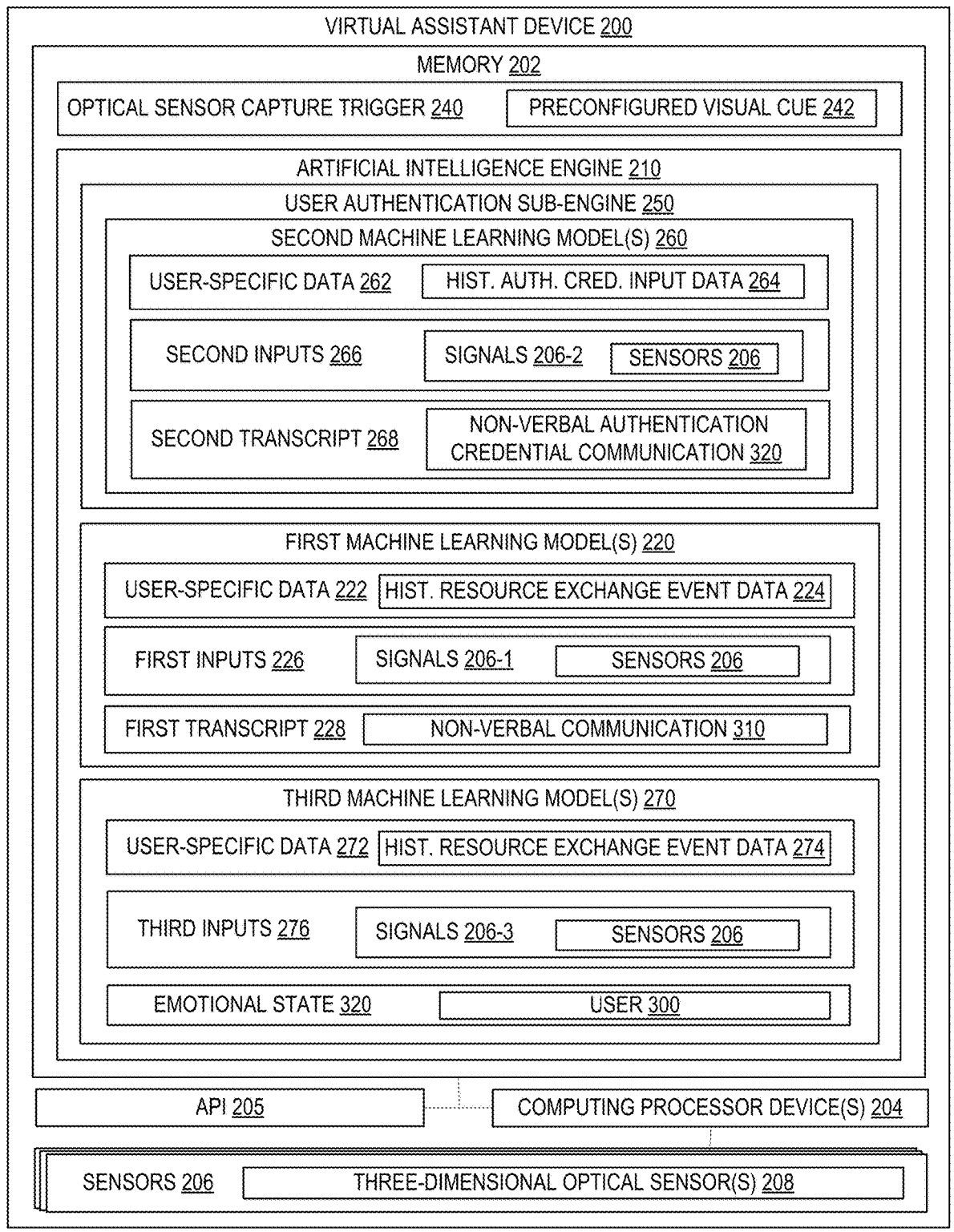
Figure 3B:
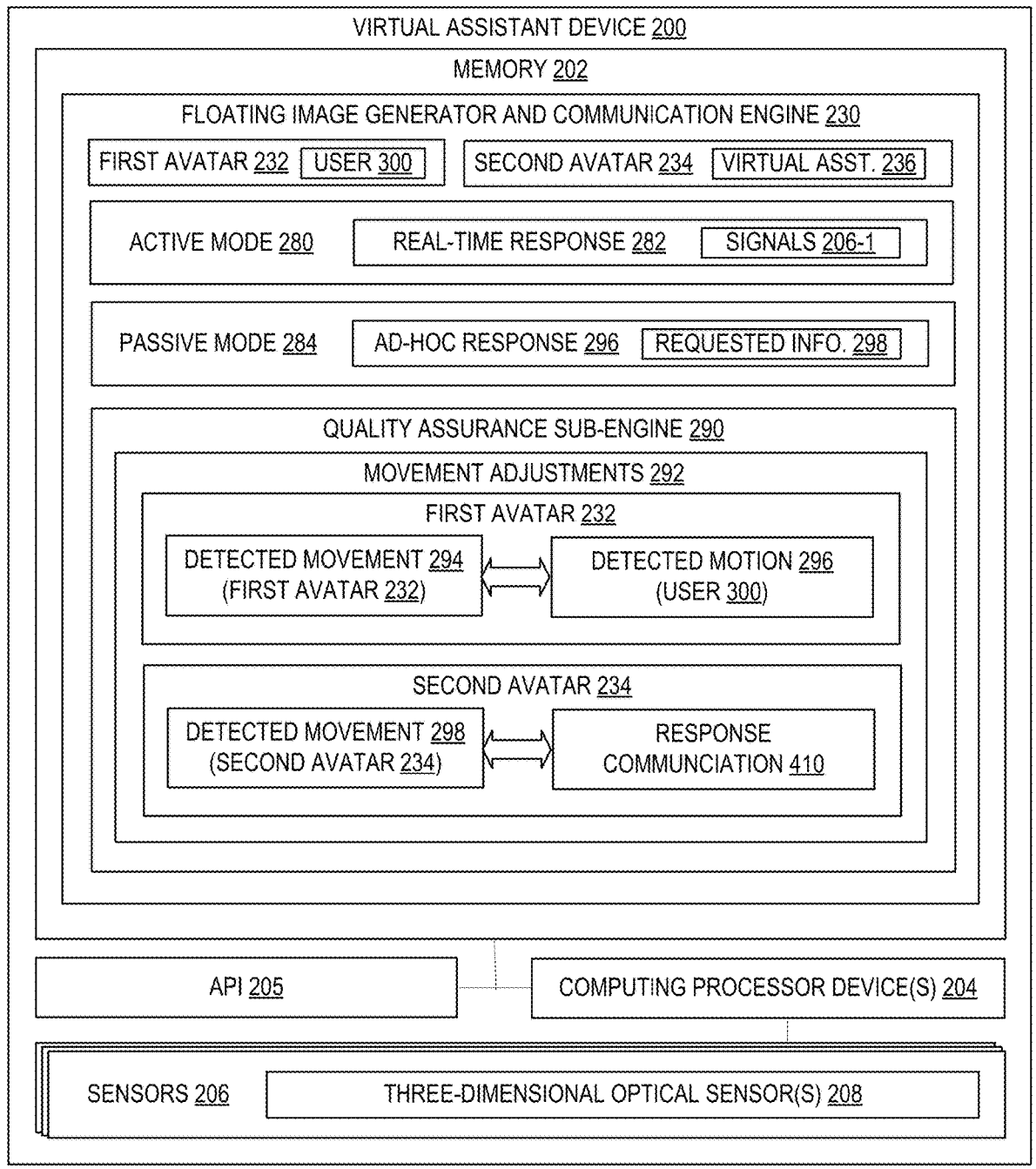

Having thus described embodiments of the disclosure in general terms, reference will now be made to the accompanying drawings, wherein:

FIG. 1 is a schematic/block diagram of a system for communicating with a virtual assistant device via non-verbal communication through the use of 3D optical sensors used to detect motions/gestures of a user and accurately deciphering the detecting motion using an Artificial Intelligence (AI)-based engine implementing Machine Learning (ML) models, in accordance with embodiments of the present invention;

FIG. 2 is schematic/block diagram of an alternate system for communicating with a virtual assistant device via non-verbal communication, in which non-verbal responses are provided to the user via 3D floating images of a virtual assistant that performs the non-verbal communication, in accordance with embodiments of the present invention;

FIGS. 3A and 3B are a block diagram of a virtual assistant device including a plurality of sensors which included 3D optical sensor(s) for capturing motion signals of a user and Artificial Intelligence (AI)-based engine implementing Machine Learning (ML) models used to decipher signals captured by the device including the motion signals, in accordance with embodiments of the present invention.

Figure 4:
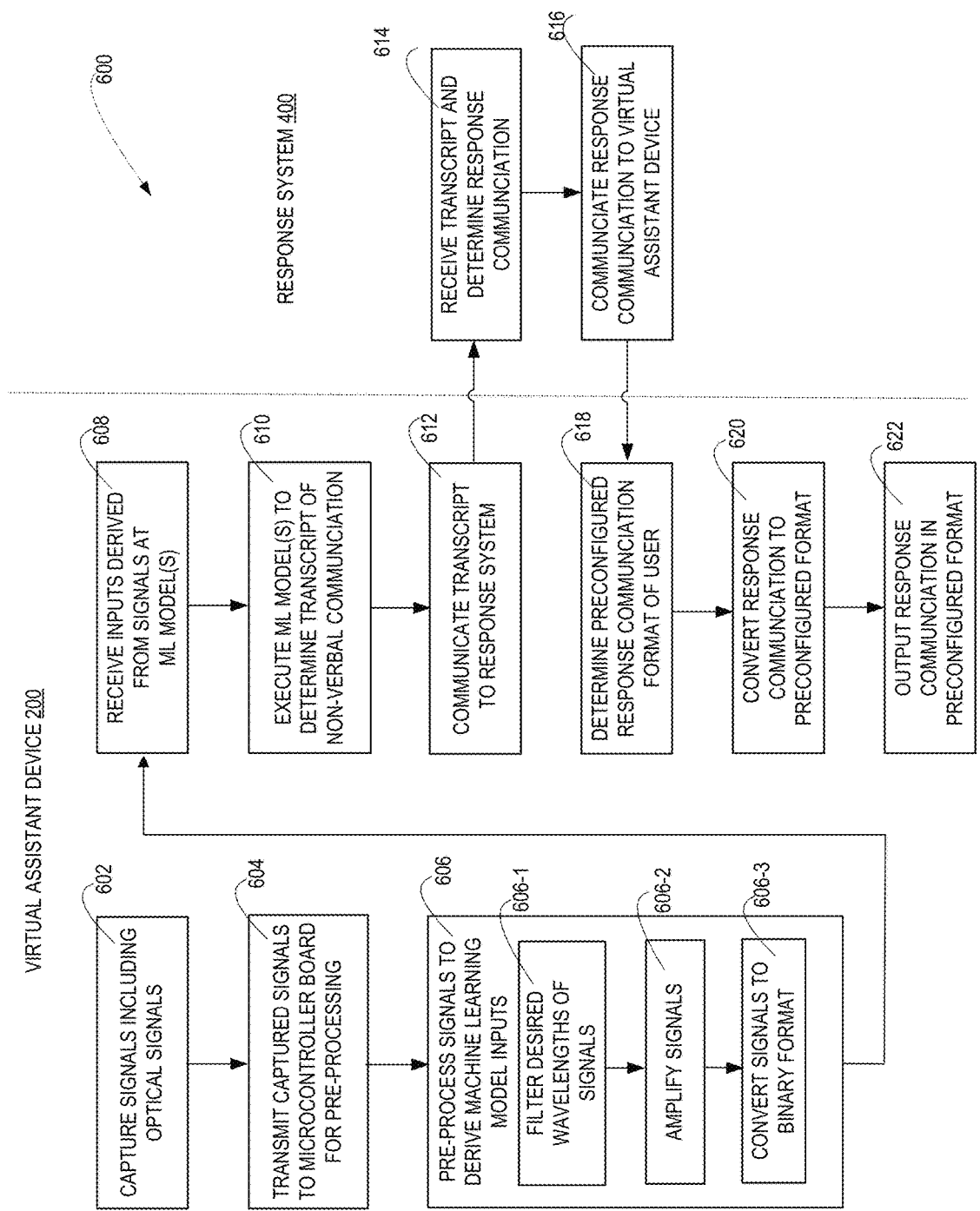
Figure 5:
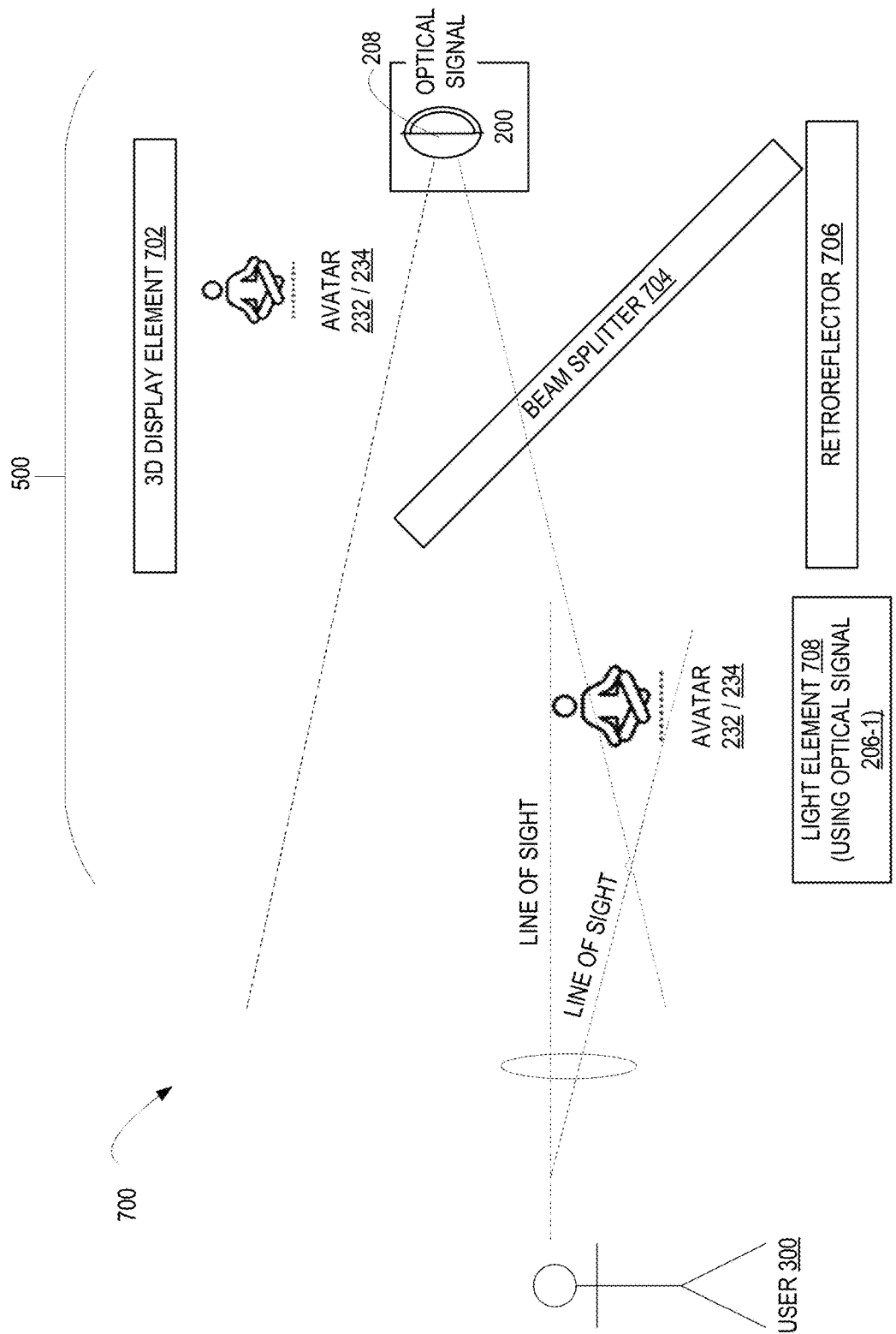
Figure 6:
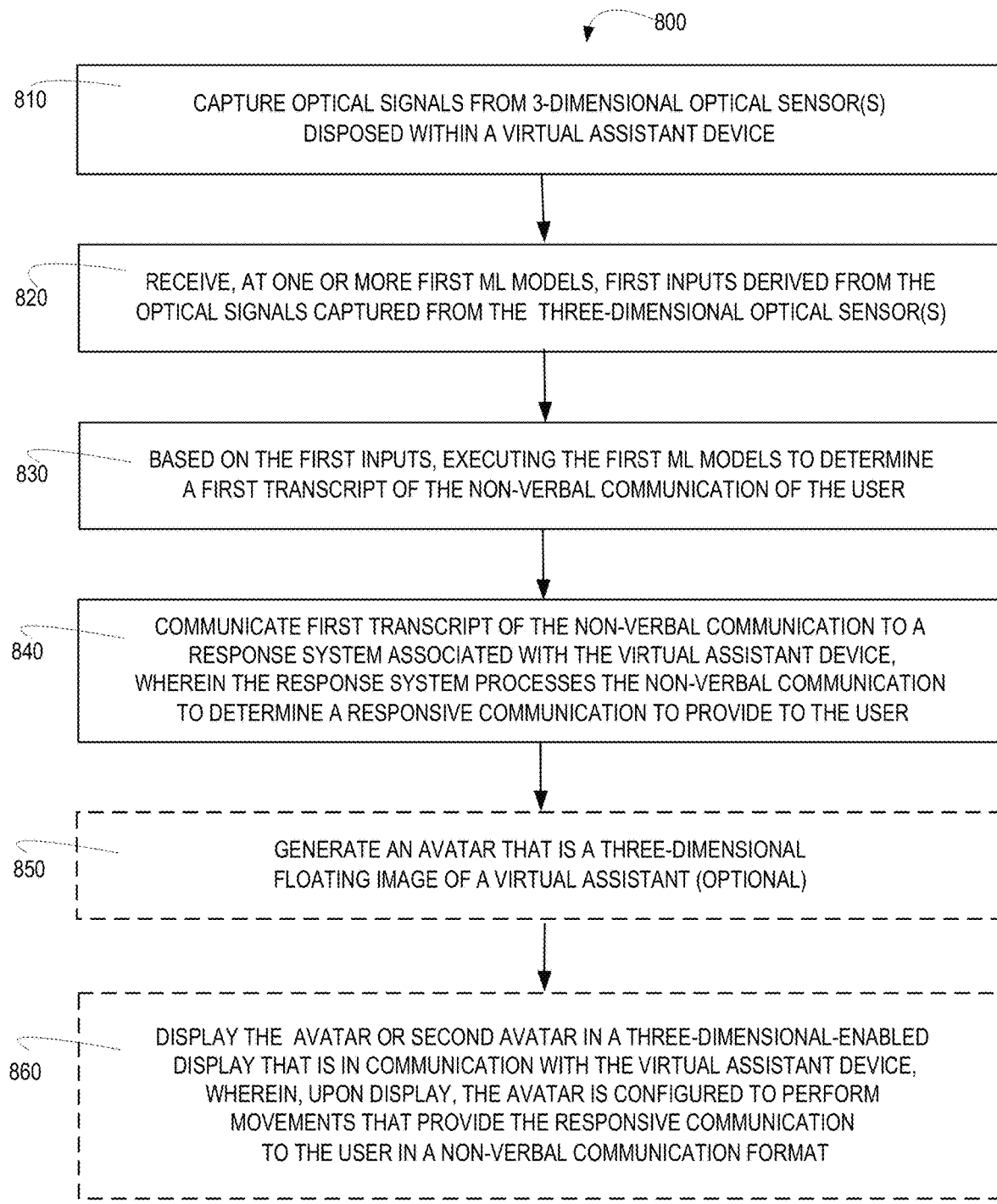

FIG. 4 is a flow diagram of a method for none-verbal communication at a virtual assistant device, in accordance with embodiments of the present invention;

FIG. 5 is a schematic diagram of a system for displaying avatars as 3D floating images, in accordance with embodiments of the present invention; and FIG. 6 is a flow diagram of a method for communicating with a virtual assistant device via non-verbal communication through the use of 3D optical sensors used to detect motions/gestures of a user and accurately deciphering the detecting motion using an Artificial Intelligence (AI)-based engine implementing Machine Learning (ML) models, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

As used herein, "resources" may be anything that can be exchanged in a transaction. For example, "resources" may be currency, goods, services, and the like. Further, as used herein a "resource exchange event" may be any interaction between a user and a network entity that includes the exchange or transfer of resources (e.g., currency for goods/services, movement of resources from one ledger/account to another ledger/account or the like).

Thus, according to embodiments of the invention, which will be described in more detail below, systems, methods and computer program products are disclosed that augment virtual assistant devices such that users having special needs (e.g., hearing-impaired, speech-impaired and the like) are able to communicate with.

In this regard, according to embodiments of the present invention, the virtual assistant devices are augmented with additional intelligent sensors, including, but not limited to, three-dimensional optical sensors that are used to capture optical signals and transmit the optical signals within the virtual assistant device. Specifically, the optical sensors are configured to capture signals used to determine non-verbal communication of a user (i.e., sign-language, lip movements, gestures or the like.

In addition, the virtual assistant device includes an Artificial Intelligence (AI)-based engine that includes one or more Machine Learning (ML) models configured to receive inputs derived from the sensors, such as inputs from the optical sensors and any other sensors embodied in the virtual assistant and, in response, determine the non-verbal communication of the user. According to the embodiments of the present invention, the ML models used to determine the non-verbal communication are trained on user-specific data, including personal details, preferences, historical resource exchange event data and patterns (i.e., both past resource exchange events conducted via the virtual assistant device/platform and those conducted outside of the virtual assistant device/platform). By utilizing the ML models with such user-specific data, the present invention is able to accurately and efficiently determine the non-verbal communication of the user.

In optional embodiments of the invention, the virtual assistant devices is configured to generate and communicate visual information to the users. Specifically, the virtual assistant devices may be configured to generate avatars that are three-dimensional floating images of the user and/or the virtual assistant. In such embodiments of the invention, the virtual assistant device includes or is in network communication with a three-dimensional display that is configured to display the avatars. In those embodiments of the invention in which the avatar(s) include an avatar that is an image of the user, the avatar is configured to replicate the movements of the user and in those embodiments in which the avatar(s) include an avatar that is an image of a virtual assistant, the avatar is configured to provide movements that communicate, non-verbally, a response to the user. In such embodiments of the invention, the optical sensors of the virtual assistant device may also capture optical signals from the avatar to determine the avatars movements and to adjust movements accordingly based on comparisons between the movement of the avatar and the movement of the user or intended response.

In specific embodiments of the invention, the virtual assistant avatar or any other response provided to the user is implemented in an active mode, in which a non-verbal response is displayed/provided in real-time response to the user providing non-verbal communication (e.g., sign language, lip movements, gestures and the like). While in other embodiments of the invention, the virtual assistant avatar or any other response provided to the user is implemented in a passive mode, in which the virtual assistant is a non-verbal response is displayed/provided as the response/information becomes available (e.g., breaking emergency weather/news)

or as preconfigured by the user (e.g., reminders, daily weather/news updates or the like).

In specific embodiments of the invention, the continual capture of signals by the sensors is triggered by a predefined visual cue/gesture, which may be predefined by the user or the visual assistant platform. In specific embodiments of the invention the AI-based engine includes a user authentication sub-engine which is configured to authenticate the user based on a predefined visual/non-verbal cue, which either serves as the user's authentication credential or reads as the user's authentication credentials (e.g., sign language, lip movements or the like). In this regard, the AI-based engine captures signals from the intelligent sensors including the 3-D optical sensors and applies inputs derived from the signals to secondary ML model(s) that are configured to determine the non-verbal user authentication credentials and communicate the user credentials to an authentication platform for subsequent user authentication. Similar to the first ML models discussed above, the second ML models are trained on user-specific data, such as historical user authentications performed via the virtual assistant and the like.

In other specific embodiments of the invention, the AI-based engine is capable of detecting the emotional state of the user (i.e., the sub-conscious mind of the user). In this regard, the AI-based engine includes a user emotional state determination sub-engine which is configured to determine the emotional state of the user through implementation of secondary ML model(s) that are configured to receive inputs derived from the various sensors, including the 3-D optical sensors and determine emotional state of the user. Once the emotional state is determined and communicated to the response system of the virtual assistant, the response that is determined and presented to the user is tailored based on the user's emotional state (e.g., frustrated, anxious, satisfied/pleased and the like).

Referring to FIG. 1, a schematic/block diagram is presented of a system 100 for communicating with a virtual assistant device via non-verbal communication through the use of 3D optical sensors used to detect motions/gestures of a user and accurately deciphering the detecting motion using an Artificial Intelligence (AI)-based engine implementing Machine Learning (ML) models, in accordance with embodiments of the invention. The system 100 is implemented in conjunction with a distributed communication network 110 that may include the Internet, one or more intranets, one or more cellular networks or the like. System 100 includes virtual assistant device 200, which may comprise a standalone-alone speaker (such as shown in FIG. 1), a mobile communication device (such as smart/mobile telephone, a smart watch or the like) or the like. One of ordinary skill in the art will understand that a virtual assistant device 200 is typically configured to communicate with a user via voice and audible responses or, in some instances, via text and written/visible responses. However, in certain instances in which the user has special needs, such as hearing impaired, speech-impaired or the like, the user may not be capable of communicating with a virtual assistant device that is configured to communicate with the user via voice and audible responses.

Thus, according to embodiments of the present invention, virtual assistant device 200 includes a memory 202 and one or more computing processor devices 204 in communication with memory 202. In addition, virtual assistant device 200 includes a plurality of sensors 206 that are in communication with one or more of the computing processor device(s) 204. The sensors 206 include at least one three-dimensional optical sensor 208 that is configured to capture optical signals that detect motion of a user 300. Other sensors may include, but are not limited to, microphones, tactile sensors, flex sensors, Inertial Measurement Unit (IMU) sensors, motion sensors, ultrasonic sensors and the like. It should be noted that the 3D optical sensor is not an image-capturing device, such as a camera or video-recording device. While the virtual assistant device 300 may include an image-capturing device, due to the complexity involved in image analysis and privacy concerns, the present invention does not rely on images of the user 100 in determining the user's non-verbal communication 310.

System 200 additionally includes Artificial Intelligence (AI)-based engine 210 that is stored in memory 202 and executable by at least one of computing processor devices 204. AI-based engine 210 includes at least one first Machine Learning (ML) model that is/are trained, at least, on user-specific data 222 (i.e., specific to user 300) including historical resource exchange event data 224, such as patterns or the like identified from the corpus of the user's historical resource exchange event data 224. It should be noted that the data 224 may be exclusive of historical resource exchange events conducted via virtual assistant devices including virtual assistant device 200 or, in other embodiments, may include data from any other resource exchange events conducted by the user 300. First ML model(s) 220 are trained to determine non-verbal communication 310 of the user 300, including, but not limited to sign-language 310-1, lip movements 310-2 and any other gestures made by the user 300.

According to embodiments of the present invention, the AI-based engine 210 is configured to receive, at one or more of the first ML models 220, first inputs 226 derived from signals 206-1 captured from the plurality of sensors 206 including optical signals captured from the 3D optical sensor(s) 208. Based on first inputs 226, the first ML model(s) 220 are executed to determine a first transcript 228 of the non-verbal communication 310 of the user 300. In this regard, first ML models 220 are configured to decipher the non-verbal communication 310 from the detected motion/movements of the user 300 and format/transform the non-verbal communication 310 into first transcript 228 (i.e., a text representation of the non-verbal communication 300). Subsequently, AI-based engine 220 is configured to initiate communication of first transcript 228 to a response system 400. In specific embodiments of the invention, response system 400 is external to the virtual assistant device 200 and, thus communication of the first transcript 228 occurs over distributed communication network 110. In other embodiments of the invention, response system 400 or a part thereof is internal to virtual response system 400 and, as thus, communication of first transcript 228 may be internal to virtual assistant device 200. Upon receipt of first transcript 228, response system 400 is configured to process the non-verbal communication 310 in first transcript 228 to determine a responsive communication 410 that is, subsequently communicated to user 300.

Referring to FIG. 2, a schematic/block diagram of a system 100 for communicating with a virtual assistant device via non-verbal communication through the use of 3D optical sensors used to detect motions/gestures of a user, accurately deciphering the detecting motion using an AI-based engine implementing ML models and communicating with the user via 3d floating avatars/images, in accordance with further embodiments of the invention. FIG. 2 includes all of the features shown and described in relation to FIG. 1 with the addition of a floating image generator and communication engine 230. As such, for the sake of brevity, those features shown and described in relation to FIG. 1 will not be described herein in relation to FIG. 2.

In specific embodiments of the invention, the system 100 includes a 3D-enabled display sub-system 500 which is either in network 110 communication with the virtual assistant device 200 (as shown in FIG. 2) or, in other embodiments of the invention, is incorporated within the virtual assistant device 200. Further, memory 202 of virtual assistant device 200 stores floating image generator and communication engine 230 which is configured to generate a first avatar 232 and/or a second avatar 234. First avatar 232 is a 3D floating image of the user 310 and second avatar is a 3D floating image of a virtual assistant 236. A floating image is a visual display where the image or video appears to be suspended in mid-air without any physical support. A floating image differs from a holographic image which are 3D representations of objects/scenes created using light interference patterns (i.e., capturing both the intensity and phase of light waves).

In response to generating first avatar 232 or second avatar 234, floating image generator and communication engine 230 display/project the first avatar 232 or second avatar 234 using the 3D-enabled display sub-system 500. Further details surrounding the display of floating images is described infra. in relation to FIG. 5. According to embodiments of the system, first avatar 232 is configured to perform movements that replicate the detected motion of the user (i.e., the non-verbal communication 310 of the user 300). In such embodiments of the invention, floating image generator and communication engine 230 is in communication with AI-based engine 210, such that floating image generator and communication engine 230 receives the output of the first ML models 220 in order to determine the movements of the first avatar 232 that will replicate the movements/motion of the user 310. Display of first avatar 232 to user 300 serves to inform the user 200 as to whether or not there non-verbal communication is being properly deciphered by the virtual assistant device 200 (i.e., if the motions of first avatar 232 are not conveying the same non-verbal communication as intended by the user, then the user needs to repeat the motions/movements or perform further clarifying; however, if the motions of first avatar 232 are conveying the same non-verbal communication as intended by the user, then the user does not need to repeat the motions/movements or perform further clarifying motions/movements).

According to embodiments of the system, second avatar 234 is configured to perform movements that provide non-verbal communication of the response communication 410 to the user 300. In such embodiments of the invention, floating image generator and communication engine 230 is in communication with response system 400, such that floating image generator and communication engine 230 receives the responsive communication 410 in order to determine the movements of the second avatar 234 that will convey the response.

In should be noted that the display of second avatar 234 is one example of how responsive communication 410 may be communicated to the user. In specific embodiments of the invention, user 310 is able to preconfigure their desired means for communicating the responsive communication 410 based on available communication output mechanisms and the user's special needs. For example, in the event that the user is sight-impaired use of the 3D floating image/avatar may not be suitable. Other communication output mechanisms that may be provided by the virtual assistant device include tactile display, such as a Braille display of the responsive communication 410, conventional 2D display of an avatar, printing of the responsive communication in Braille or in enlarged text or the like.

Referring to FIGS. 3A and 3B, block diagrams are depicted of a virtual assistant device 200, in accordance with embodiments of the present invention. In addition to providing greater details of the AI-based engine 210 and floating image generator and communication engine 230, FIGS. 3A and 3B highlight various alternate embodiments of the invention. As previously discussed, virtual assistant device 200 may comprise a standalone speaker-like device, a mobile device, such as smart phone or smart watch or the like.

Virtual assistant device 200 includes memory 202, which may comprise volatile and/or non-volatile memory, such as read-only and/or random-access memory (RAM and ROM), EPROM, EEPROM, flash cards, or any memory common to computing platforms). Moreover, memory may comprise cloud storage, such as provided by a cloud storage service and/or a cloud connection service.

Further, virtual assistant device 200 includes one or more computing processor devices 204, which may be an application-specific integrated circuit ("ASIC"), or other chipset, logic circuit, or other data processing device. Computing processing device(s) 204 may execute one or more application programming interface (APIs) 205 that interface with any resident programs, such as AI-based engine 210 and floating image generator and communication engine 230 or the like, stored in memory 202 of virtual assistant device 200 and any external programs. Virtual assistant device 200 may include various processing subsystems (not shown in FIGS. 3A and 3B embodied in hardware, firmware, software, and combinations thereof, that enable the functionality of virtual assistant device 200 and the operability of virtual assistant device 200 on a distributed communication network 110 (shown in FIG. 1) such as the Internet, intranet(s), cellular network(s) and the like. For example, processing subsystems allow for initiating and maintaining communications and exchanging data with other networked devices. For the disclosed aspects, processing subsystems of virtual assistant device 200 may include any subsystem used in conjunction with AI-based engine 210 and floating image generator and communication engine 230 and related tools, routines, sub-routines, applications, sub-applications, sub-modules thereof.

In specific embodiments of the present invention, virtual assistant device 200 additionally include a communications module (not shown in FIGS. 3A and 3B) embodied in hardware, firmware, software, and combinations thereof, that enables electronic communications between components of virtual assistant device 200 and other networks and network devices. Thus, communication module may include the requisite hardware, firmware, software and/or combinations thereof for establishing and maintaining a network communication connection with one or more devices and/or networks.

As previously discussed, and shown in FIGS. 3A and 3B, virtual assistant device 200 includes a plurality of sensors 206 that are configured to capture signals from the environment in which the virtual assistant device 200 is located. The sensors 206 include at least one 3D optical sensor 208 that is configured to capture optical signals that detect motion/movements of the user 300. In specific embodiments of the invention, the 3D optical sensor emits a light sensor, such as a laser light or structured light pattern and the light interacts with and reflects off of the objects in the immediate environment. In time-of flight (ToF)-based 3D sensor, the reflected light is captured by the sensor, and the time for the light to travel to the objects and back is measured. This time delay is used to calculate the distance between the object and the sensor. By repeating this process multiple times, a depth map can be determined that indicates the position and movement of the object in three dimensions. Alternatively, 3D optical sensors can detect changes in the light's frequency or pattern and the deformation of such light patterns caused by the objects are captured by the sensors. By analyzing distortions in the patterns, the sensors can calculate the depth information and create a 3D representation.

Additionally, sensors 206 may include, but are not limited to, microphones, tactile sensors, flex sensors, IMU sensors, motion sensors, ultrasonic sensors and the like. It should be noted that, according to embodiments of the invention, data/signals captured from the other sensors may supplement the optical signal data and may be used to derive the first inputs 226 to the ML model(s) 220 (i.e., used to determine the non-verbal communication 310 of the user 300).

As shown in FIG. 3A, in specific embodiments of the invention, the 3D optical sensor(s) 208 are configured to continually capture optical signals in response to detecting/capturing an optical sensor capture trigger 250. Optical sensor capture trigger 240 is a preconfigured visual cue 242, such as preconfigured gesture or motion that when performed by the user in the vicinity of the virtual assistant device 200 prompts continual capture of optical signals. Thus, performance of the preconfigured visual cue 242 by the user 300 means that user desires to communicate with the virtual assistant via non-verbal communication, and the 3D optical sensor(s) 208 are triggered/awakened for subsequent continual capture of optical signals so that the non-verbal communication can be captured and deciphered. In other embodiments of the invention, the virtual assistant device 200 may be configured with other means for triggering continual capture of optical signals, such as a physical or software embodied switch or the like. While in other embodiments of the invention, the 3D optical sensors 208 may be configured in an "always-on" mode in which optical signals are continually captured at all times.

Memory 402 of virtual assistant device 200 stores AI-based engine 210 which is executable by at least one of the one or more computing processor devices 204. In specific embodiments of the invention, AI-based engine 210 includes user authentication sub-engine 250 which is configured to authenticate the user 300 for subsequent resource exchange events and the like conducted via the virtual assistant device 200. User authentication sub-engine 250 includes at least one second ML models 260 trained at least one user-specific data 262 including historical authentication credential input data 264 for purposes of determining the user's non-verbal authentication credential communication. Similar to first ML model(s) 220, second ML model(s) 260 are trained to determine non-verbal communication 310 of the user 300, specifically non-verbal authentication credential communication 320 including, but not limited to sign-language 310-1, lip movements 310-2 and any other gestures made by the user 300. For example, the user 300 may have a specific gesture that denoted their authentication credentials or may provide sign language or lip movements that translate to the user's designated authentication credentials.

Specifically, user authentication sub-engine 250 is configured to receive, at the second ML model(s) 260, second inputs 266 derived from signals 206-2 captured from the plurality of sensors 206 including optical signals captured from the 3D optical sensor(s) 208. In response to receiving second inputs 266, second ML model(s) 260 are executed to determine a second transcript 268 of the non-verbal authentication communication 320 of the user 300. In response, second transcript 268 is communicated to an authenticating entity/platform which, in turn, processes the authentication credentials 320 in the second transcript 268 to authenticate the user 300 for conducting resource exchange events. The authenticating entity/platform may be associated with a financial institution, an online retailer or the like or any other network entity at which the user 300 desires to conduct a resource exchange event.

As previously discussed in relation to FIG. 1, AI-based engine 210 includes at least one first Machine Learning (ML) model that is trained, at least, on user-specific data 222 (i.e., specific to user 300, such as personal data or the like) including historical resource exchange event data 224, such as patterns or the like identified from the corpus of the user's historical resource exchange event data 224. First ML model(s) 220 are trained to determine non-verbal communication 310 of the user 300, including, but not limited to sign-language 310-1, lip movements 310-2 and any other gestures made by the user 300.

According to embodiments of the present invention, the AI-based engine 210 is configured to receive, at one or more of the first ML models 220, first inputs 226 derived from signals 206-1 captured from the plurality of sensors 206 including optical signals captured from the 3D optical sensor(s) 208. Based on first inputs 226, the first ML model(s) 220 are executed to determine a first transcript 228 of the non-verbal communication 310 of the user 300. In this regard, first ML models 220 are configured to decipher the non-verbal communication 310 from the detected motion/movements of the user 300 and format/transform the non-verbal communication 310 into first transcript 228 (i.e., a text representation of the non-verbal communication 300). Subsequently, AI-based engine 220 is configured to initiate communication of first transcript 228 to a response system 400. In specific embodiments of the invention, response system 400 is external to the virtual assistant device 200 and, thus communication of the first transcript 228 occurs over distributed communication network 110. In other embodiments of the invention, response system 400 or a part thereof is internal to virtual response system 400 and, as thus, communication of first transcript 228 may be internal to virtual assistant device 200. Upon receipt of first transcript 260, response system 400 is configured to process the non-verbal communication 310 in first transcript 228 to determine a responsive communication 410 that is, subsequently communicated to user 300.

In alternate embodiments of the invention, AI-based engine 210 at least one third Machine Learning (ML) model 270 that is trained, at least, on user-specific data 272 including historical resource exchange event emotional state data 274, such as patterns or the like identified from the corpus of the user's historical resource exchange event data 224. Third ML model(s) 270 are trained to determine the emotional state 320 of the user based on how the non-verbal communication 310 of the user 300 is delivered.

According to embodiments of the present invention, the AI-based engine 210 is configured to receive, at one or more of the third ML models 270, third inputs 276 derived from signals 206-3 captured from the plurality of sensors 206 including optical signals captured from the 3D optical sensor(s) 208. Based on third inputs 276, the third ML model(s) 270 are executed to determine an emotional state of the user 320. Subsequently, AI-based engine 220 is configured to initiate communication of the emotional state to a response system 400. Upon receipt of emotional state 320, response system 400 is configured to further determine a responsive communication 410 based on the user's emotional state 320 and, subsequently communicate the responsive communication to user 300.

Referring to FIG. 3B, memory 202 of virtual assistant device 200 stores floating image generator and communication engine 230 which is configured to generate a first avatar 232 and/or a second avatar 234. First avatar 232 is a 3D floating image of the user 310 and second avatar is a 3D floating image of a virtual assistant 236. In response to generating first avatar 232 or second avatar 234, floating image generator and communication engine 230 display/project the first avatar 232 or second avatar 234 using the 3D-enabled display sub-system 500. According to embodiments of the system, first avatar 232 is configured to perform movements that replicate the detected motion of the user (i.e., the non-verbal communication 310 of the user 300). In such embodiments of the invention, floating image generator and communication engine 230 is in communication with AI-based engine 210, such that floating image generator and communication engine 230 receives the output of the first ML models 220 in order to determine the movements of the first avatar 232 that will replicate the movements/motion of the user 310. Display of first avatar 232 to user 300 serves to inform the user 200 as to whether or not there non-verbal communication is being properly deciphered by the virtual assistant device 200 (i.e., if the motions of first avatar 232 are not conveying the same non-verbal communication as intended by the user, then the user needs to repeat the motions/movements or perform further clarifying; however, if the motions of first avatar 232 are conveying the same non-verbal communication as intended by the user, then the user does not need to repeat the motions/movements or perform further clarifying motions/movements).

According to embodiments of the system, second avatar 234 is configured to perform movements that provide non-verbal communication of the response communication 410 to the user 300. In such embodiments of the invention, floating image generator and communication engine 230 is in communication with response system 400, such that floating image generator and communication engine 230 receives the responsive communication 410 in order to determine the movements of the second avatar 234 that will convey the response.

In specific embodiments of the invention, the virtual assistant device 200 may operate in an active mode 280, in which the second avatar 234 (or any other responsive communication presented to the user) is displayed or outputted to the user in real-time response 282 to capturing the signals 206-1 that indicate non-verbal communication by the user 300. In other embodiments of the invention, the virtual assistant device 200 may operate in a passive mode, in which second avatar 234 (or any other communication presented to the user 300) is displayed or outputted to the user as an ad hoc response 286 to requested information 288. For example, the user may preconfigure the virtual assistant device 200 to provide specific requested information 288 as it becomes available or at prescribed intervals or times of day.

In addition, floating image generator and communication engine 230 may include a quality assurance sub-engine 290 that is configured to make movement adjustments 292 to the first avatar 232 and/or second avatar 224. Movement adjustments 292 to the first avatar 232 are made based on comparisons between the detected movement 294 of the first avatar 232 and detected motion 296 of the user 300. In this regard, quality assurance sub-engine 290 relies on the sensors 206 and, specifically, the 3D optical sensors 208 to capture signals that detect movement 294 of the first avatar 232. Movement adjustments 292 are made if the comparison determines a difference between the detected movement 294 of the first avatar 232 and detected motion 296 of the user 300. In other words, the movements of the first avatar 232 are continuously refined based on the comparisons so that the first avatar accurately reflects the movements/motions being made by the user 300.

Movement adjustments 292 to the second avatar 234 are made based on comparisons between the detected movement 298 of the second avatar 234 and the responsive communication 410. In this regard, quality assurance sub-engine 290 relies on the sensors 206 and, specifically, the 3D optical sensors 208 to capture signals that detect movement 298 of the second avatar 234. Movement adjustments 292 are made if the comparison determines a difference between the detected movement 298 of the second avatar 232 and response communication 410. In other words, the movements of the second avatar 234 are continuously refined based on the comparisons so that the second avatar 234 accurately communicates the response communication to the user 300.

Referring to FIG. 4 a flow diagram is presented of a method 600 for non-verbal communication using a virtual assistant device, in accordance with embodiments of the present invention. At Event 602, signals are captured at a virtual assistant device including optical signals, which are captured by 3D optical sensors disposed within the virtual assistant device. The capturing of optical signals may be triggered by a user-configured motion or gesture that when recognized prompts continual capture of optical signals (i.e., capture until the optical signals no longer indicate motions being made by the user that are indicative of non-verbal communication). As previously discussed, other signals besides optical signals may also be captured and used to assist in determining the non-verbal communication of the user. Such other signals may include, but are not limited to, audible signals, tactile signals, and the like.

At Event 604 the captured signals including optical signals are transmitted to a microcontroller board, such as RASPBERRY PI®, ARDUINO UNOR or the like, for pre-processing. At Event 606, the signals are pre-processed for purposes of deriving the inputs for the machine learning models. Pre-processing may include, but is not limited to, filtering 606-1 the signals for desired wavelengths (e.g., using a band pass filter to out desired wavelengths, using an optical center of Plano lens to filter out desired motion and/or light wavelengths and the like), amplifying 606-2 the signals using a double stage inverter amplifier or the like and converting the signals to a digital/binary format using an analog Input/Output (I/O) module or the like.

At Event 608, the inputs derived from the captured signals are received at ML model(s) that have been trained to determine non-verbal communication. Specifically, the ML model(s) are trained using user-specific data, such as personal data, historical resource exchange event data including patterns, such as previous resource exchange events conducting via the virtual assistant device using non-verbal communication. At Event 610, the ML model(s) are executed to determine a transcript (i.e., text) of the non-verbal communication. In this regard, the ML models determine the meaning and the user's intent of the motions they are making (e.g., sign language, lip movements, gestures and the like) and capture the meaning and intent in the transcript. At Event 612, the transcript is communicated a response system.

At Event 614, the response system receives the transcript and determines an appropriate response communication, which, at Event 616 is communicated back to the virtual assistant device. At Event 618, the virtual assistant device determines the user's preconfigured response communication format from amongst one or more available response communication formats (e.g., avatar/3D floating image, computerized display of Braille, print out (standard or Braille) of the response communication or the like). At Event 620, the response communication is converted to the user's preconfigured response communication format (e.g., avatar/3D floating image generated and movements to convey the response communication non-verbally are determined, response communication converted to Braille or the like. At Event 622, the response communication, in the converted reconfigured format, is outputted to the user (e.g., avatar/3D floating image is displayed/projected to the user using, for example, the sub-system shown and described in relation to FIG. 5, computerized display of Braille, print output or the like.

Referring to FIG. 5 a side/schematic view of a floating image display environment 700 in which a 3D-enabled display sub-system 500 of the present invention is operating to display floating 3D image/avatar 232 or 234 to user 300. To produce floating 3D image/avatar 232 or 234 3D-enabled display sub-system 500 includes a 3D display element 702, which may be a Liquid Crystal Display (LCD) or similar display device operable to provide 3D image/avatar 232 or 234 on a display surface of the 3D display element 702. Such a 3D image/avatar 232 or 234 may be high brightness image such as by selecting the LCD or other display element 702 to be daylight-viewable (e.g., a display element 702 with luminance of 1500-2500 Nits or higher). Such high levels of luminance are desirable for the display element 702 due to losses in the 3D-enabled display sub-system 500, such as at beam splitter 704 and because it is preferred that the displayed floating 3D image/avatar 232 or 234 be sharp and bright so as to be viewable in higher light spaces by user 300. In other embodiments of the invention, 3D image/avatar 232 or 234 is created through use of a multiplane display element 702, which also may be designed to provide the 3D image/avatar 232 or 234 with high brightness (luminance of 1500-2500 Nits or higher).

The outer display surface of 3D display element 702 is arranged to be facing downward (e.g., the outer display surface is parallel to the floor/ground of the floating image display environment 700) to project or display the 3D image/avatar 232 or 234 downward. In other embodiments of the invention, the outer display surface may be oriented differently such as to vertical. The 3D image/avatar 232 or 234 on display surface has a height and the 3D-enabled display sub-system 500 is adapted such that the floating image 3D image/avatar 232 or 234 (depicted below the beam splitter 704) matches the height of the 3D image/avatar 232 or 234.

The beam splitter 704 is positioned such that the distance from the upper surface of the beam splitter 704 to the outer display surface of 3D display element 702 matches the distance from the lower surface of the beam splitter 704 to the focal point of the floating image 3D image/avatar 232 or 234. In addition, beam splitter 704 is selected to large enough (e.g., adequately large length, that is greater than a width of the display surface of 3D display element 702 or at least greater than the height of the 3D image/avatar 232 or 234) such that when the beam splitter 704 is arranged at an angle, typically 45 degrees as shown, to the display surface of 3D display element 702 it can receive all of the light associated with the image. Beam splitter 704 is transmissive to the light, as well as reflecting a portion of the light off of the upper surface of the beam splitter 704 away from the user 300, and, as a result, light associated with the 3D image/avatar 232 or 234 passes through the beam splitter 704.

3D-enabled display sub-system 500 also includes retroreflector 706 positioned with reflective surface facing the lower surface of the beam splitter 704. The reflected light from the from the retroreflector 706 strikes the lower surface of the beam splitter 704 and a portion is reflected by the beam splitter 704 while another portion is transmitted through the beam splitter 704. The light that is reflected by the beam splitter 704 acts to create the displayed 3D floating image/avatar 232 or 234 (show to the left of the beam splitter 704). The retroreflector 706 may take many forms including but not limited to a sheet of retroreflective material (e.g., with a 60 degree acceptance angle or the like) that is configured to reflect back along a vector that is parallel to but opposite in direction from the source light provided by lighting element 708, which may be provided using optical signal from optical sensor 208 of the virtual display device 200. Further, the reflective surface of retroreflector 706 may include numerous corner reflectors, Cat's eye reflectors, phase-conjugate mirror or the like as found in conventional retroreflective materials.

Referring to FIG. 6, a flow diagram is depicted of a method for detecting and deciphering non-audible communication, in accordance with embodiments of a present invention. At Event 810, optical signals are captured by 3D optical sensors disposed within a virtual assistant device. Additional signals may be captured from other sensors within the virtual assistant device, with the additional signals augmenting the optical signals in determining the non-audible communication (e.g., sign language, lip movements, gestures or the like) being made by a user. As previously discussed, the virtual assistant device may be a standalone device, typically a microphone/speaker device or may be multi-functional device, such as a smart phone, smart watch or the like.

At Event 820, first inputs are received at first ML models, which have derived from the optical signals captured by the 3D optical sensors. The first signals may be derived by pre-processing the signals which may include, but is not limited to, filtering desired wavelengths from the signals, amplifying the signals and/or converting/transforming the signals to a binary format. Based on the first inputs, at Event 830, the first ML model(s) are executed to determine a first transcript of the non-verbal communication. In this regard, the ML models are similar in function to Automatic Speech Recognition (ASR) and Natural Language Processing (NLP) in conventional voice recognition/interpretation processing, in that, the first ML models serve to convert the digital/binary motion/movement data to text and, in some instances, understanding the user's intent.

At Event 840, the first transcript is communicated to a response system which may be internal to the virtual assistant device or, in most instances, require, network communication to an external response system. The response system processes the transcript to determine a responsive communication to provide to the user.

At optional Event 850, an avatar is generated that is a 3D floating image of a virtual assistant and, at optional Event 860, the avatar is displayed/projected using a 3D-enabled display that is in internal or network communication with the virtual assistant device. Upon display/projection, the avatar is configured to perform movements (e.g., sign language, gestures, lip movements and/or the like) which serve to communicate the responsive communication to the user in a non-verbal communication format.

Thus, present embodiments of the invention discussed in detail above, provides for virtual assistant devices and related methods that allow users having special needs (e.g., hearing-impaired, speech-impaired and the like) to communicate with and, in some embodiments, receive communication from the virtual assistant device. Specifically, the virtual assistant devices are augmented with additional intelligent sensors, including, but not limited to, three-dimensional optical sensors that are used to capture optical signals of user's non-verbal communication (e.g., sign language, lip movements, gestures or the like). In addition, the virtual assistant device includes an Artificial Intelligence (AI)-based engine that includes one or more Machine Learning (ML) models trained on user-specific data and used to determine the non-verbal communication of the user (i.e., sign language, lip movements or other gestures) based on inputs derived from the sensors, such as inputs from the optical sensors and any other sensors embodied in the virtual assistant. In further embodiments of the invention, the virtual assistant devices are capable of generating and displaying visual information to the users. Specifically, the virtual assistant devices may be configured to generate avatars that are three-dimensional floating images of either the user or the virtual assistant. In such embodiments of the invention, the virtual assistant device includes or is in network communication with a three-dimensional display that is configured to display the avatars.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for multi-dimensional extrasensory deciphering of non-verbal communication of a user, the system comprising:
 a virtual assistant device including a memory, one or more computing processing devices in communication with the memory and a plurality of sensors in communication with at least one of the one or more computing processing devices, wherein the plurality of sensors include at least one three-dimensional optical sensor configured for capturing, at least, optical signals that detect motion of the user;
 an artificial intelligence (AI)-based engine stored in the memory, executable by at least one of the one or more computing processing devices, and including at least one first machine-learning (ML) model trained at least on user-specific data including historical resource exchange event data for purposes of determining non-verbal communication of the user, wherein the AI-based engine is configured to:
  receive, at one or more of the first ML models, first inputs derived from signals captured from the plurality of sensors including the optical signals captured from the at least one three-dimensional optical sensor,
  based on the first inputs, execute the one or more of the first ML models to determine a first transcript of the non-verbal communication of the user, and
  communicate the first transcript of the non-verbal communication to a response system associated with the virtual assistant device, wherein the response system processes the non-verbal communication to determine a responsive communication to provide to the user;
 a three-dimensional-enabled display sub-system in communication with the virtual assistant device; and
 a floating image-generating and communication engine including a quality assurance sub-engine, stored in the memory, executable by at least one of the one or more computing processing devices, and configured to:
  generate an avatar that is a three-dimensional floating image of the user, and
  display the avatar in the three-dimensional-enabled display, wherein the avatar is configured to perform movements that replicate detected motion of the user, and
  adjust the movements performed by the avatar based on movements of the avatar detected by the three-dimensional optical sensors in comparison to the detected motion of the user.

2. The system of claim 1, further comprising:
 a three-dimensional-enabled display sub-system in communication with the virtual assistant device; and
 a floating image-generating and communication engine stored in the memory, executable by at least one of the one or more computing processing devices and configured to:
  generate an avatar that is a three-dimensional floating image of a virtual assistant, and
  display the avatar in the three-dimensional-enabled display system, wherein the avatar is configured to perform movements that provide the responsive communication to the user in a non-verbal communication format.

3. The system of claim 2, wherein the least one three-dimensional optical sensor are configured for detecting movements of the avatar, and
 wherein the floating image-generating and communication engine further comprises a quality assurance sub-engine configured to adjust the movements performed by the avatar based on the detected movements of the avatar in comparison to the responsive communication.

4. The system of claim 2, wherein the floating image-generating and communication engine is further configured to display the avatar in the three-dimensional-enabled display in at least one chosen from group consisting of (i) an active mode in which the avatar is displayed as a real-time response to capturing the optical signals associated with detected motion of the user and (ii) a passive mode in which the avatar is displayed in response to the virtual assistant device determining preconfigured communication that has been requested by the user.

5. The system of claim 1, wherein the AI-based engine further comprises at least one second machine-learning (ML) model trained at least on user-specific data including historical resource exchange event emotional state data for purposes of determining an emotional state the user, and wherein the AI-based engine is configured to:
 receive, at one or more of the second ML models, second inputs derived from signals captured from the plurality of sensors including the optical signals captured from the at least one three-dimensional optical sensor,
 based on the second inputs, execute the one or more of the second ML models to determine an emotional state of the user, and
 communicate the emotional state of the user to the response system, wherein the response system determines the responsive communication based further on the emotional state of the user.

6. The system of claim 1, wherein the AI-based engine further comprises a user authentication sub-engine comprising at least one second machine-learning (ML) model trained at least on user-specific data including historical authentication credential input data for purposes of determining non-verbal authentication credential communication from the user, wherein the user authentication sub-engine is configured to:
receive, at one or more of the second ML models, second inputs derived from signals captured from the plurality of sensors including the optical signals captured from the at least one three-dimensional optical sensor,
based on the second inputs, execute the one or more of the second ML models to determine a second transcript of the non-verbal authentication credential communication of the user, and
communicate the second transcript of the non-verbal authentication credential communication to an authenticating entity, wherein the authenticating entity processes the non-verbal authentication credential communication to authenticate the user for conducting one or more resource exchange events.

7. The system of claim 1, wherein the at least one three-dimensional optical sensor is further configured for detecting a preconfigured visual cue of the user, wherein detection of the preconfigured visual cue triggers further continual capturing of the optical signals.

8. A computer-implemented method for multi-dimensional extrasensory deciphering of non-verbal communication of a user, at least a portion of the method being executable by one or more computing device processors and comprising:
capturing optical signals from at least one three-dimensional optical sensor disposed within a virtual assistant device;
receiving, at one or more first ML models, first inputs derived from the optical signals captured from the at least one three-dimensional optical sensor;
based on the first inputs, executing the one or more first ML models to determine a first transcript of the non-verbal communication of the user;
communicating first transcript of the non-verbal communication to a response system associated with the virtual assistant device, wherein the response system processes the non-verbal communication to determine a responsive communication to provide to the user;
generating at least one chosen from the group consisting of (i) a first avatar that is a three-dimensional floating image of the user and (ii) a second avatar that is a three-dimensional floating image of a virtual assistant;
displaying the first avatar or second avatar in a three-dimensional-enabled display that is in communication with the virtual assistant device, wherein, upon display, the first avatar is configured to perform movements that replicate detected motion of the user and the second avatar is configured to perform movements that provide the responsive communication to the user in a non-verbal communication format;
detecting from the optical signals movements of at least one chosen from the group consisting of (i) the first avatar and (ii) the second avatar; and
adjusting the movements performed by at least one chosen from the group consisting of (i) the first avatar and (ii) the second avatar based on at least one chosen from the group consisting of (i) the detected movements of the first avatar in comparison to the detected motion of the user and (ii) the detected movements of the avatar in comparison to the responsive communication.

9. The computer-implemented method of claim 8, wherein displaying the second avatar in the three-dimensional-enabled display further comprises displaying the second avatar in the three-dimensional-enabled display in at least one chosen from group consisting of (i) an active mode in which the avatar is displayed as a real-time response to capturing the optical signals associated with detected motion of the user and (ii) a passive mode in which the avatar is displayed in response to the virtual assistant device determining preconfigured communication that has been requested by the user.

10. The computer-implemented method of claim 8, further comprising:
capturing signals from a plurality of sensors included within the virtual assistant device;
receiving, at one or more second ML models, second inputs derived from signals captured from the plurality of sensors including the optical signals captured from the at least one three-dimensional optical sensor;
based on the second inputs, executing the one or more second ML models to determine an emotional state of the user; and
communicating the emotional state of the user to the response system, wherein the response system determines the responsive communication based further on the emotional state of the user.

11. The computer-implemented method of claim 8, further comprising:
capturing signals from a plurality of sensors included within the virtual assistant device;
receiving, at one or more second ML models, second inputs derived from signals captured from the plurality of sensors including the optical signals captured from the at least one three-dimensional optical sensor,
based on the second inputs, executing the one or more second ML models to determine a second transcript of a non-verbal authentication credential communication of the user, and
communicating the second transcript of a non-verbal authentication credential communication to an authenticating entity, wherein the authenticating entity processes the second transcript of a non-verbal authentication credential communication to authenticate the user for conducting one or more resource exchange events.

12. A computer program product comprising:
a non-transitory computer-readable medium comprising sets of codes for causing one or more computing devices to:
capture optical signals from at least one three-dimensional optical sensor disposed within a virtual assistant device, wherein the optical signals detect motion of a user;
receive, at one or more first ML models, first inputs derived from the optical signals captured from the at least one three-dimensional optical sensor;
based on the first inputs, (i) execute the one or more first ML models to determine a first transcript of the non-verbal communication of the user based on the detected motion;
communicate the first transcript of the non-verbal communication to a response system associated with the virtual assistant device, wherein the response system processes the non-verbal communication to determine a responsive communication to provide to the user;

generate at least one chosen from the group consisting of (i) a first avatar that is a three-dimensional floating image of the user and (ii) a second avatar that is a three-dimensional floating image of a virtual assistant;

display the first avatar or second avatar in a three-dimensional-enabled display that is in communication with the virtual assistant device, wherein, upon display, the first avatar is configured to perform movements that replicate detected motion of the user and the second avatar is configured to perform movements that provide the responsive communication to the user in a non-verbal communication format;

detect from the optical signals movements of at least one chosen from the group consisting of (i) the first avatar and (ii) the second avatar; and adjust the movements performed by at least one chosen from the group consisting of (i) the first avatar and (ii) the second avatar based on at least one chosen from the group consisting of (i) the detected movements of the first avatar in comparison to the detected motion of the user and (ii) the detected movements of the avatar in comparison to the responsive communication.

13. The computer program product of claim 12, wherein the sets of codes further cause the one or more computing devices to:

capture signals from a plurality of sensors included within the virtual assistant device;

receive, at one or more second ML models, second inputs derived from signals captured from the plurality of sensors including the optical signals captured from the at least one three-dimensional optical sensor;

based on the second inputs, execute the one or more second ML models to determine an emotional state of the user; and communicate the emotional state of the user to the response system, wherein the response system determines the responsive communication based further on the emotional state of the user.

14. The computer program product of claim 12, wherein the sets of codes further cause the one or more computing devices to:

capture signals from a plurality of sensors included within the virtual assistant device;

receive, at one or more second ML models, second inputs derived from signals captured from the plurality of sensors including the optical signals captured from the at least one three-dimensional optical sensor, based on the second inputs, execute the one or more second ML models to determine a second transcript of a non-verbal authentication credential communication of the user; and communicate the second transcript of the non-verbal authentication credential communication to an authenticating entity, wherein the authenticating entity processes the non-verbal authentication credential communication to authenticate the user for conducting one or more resource exchange events.

* * * * *